Figures 1, 2:
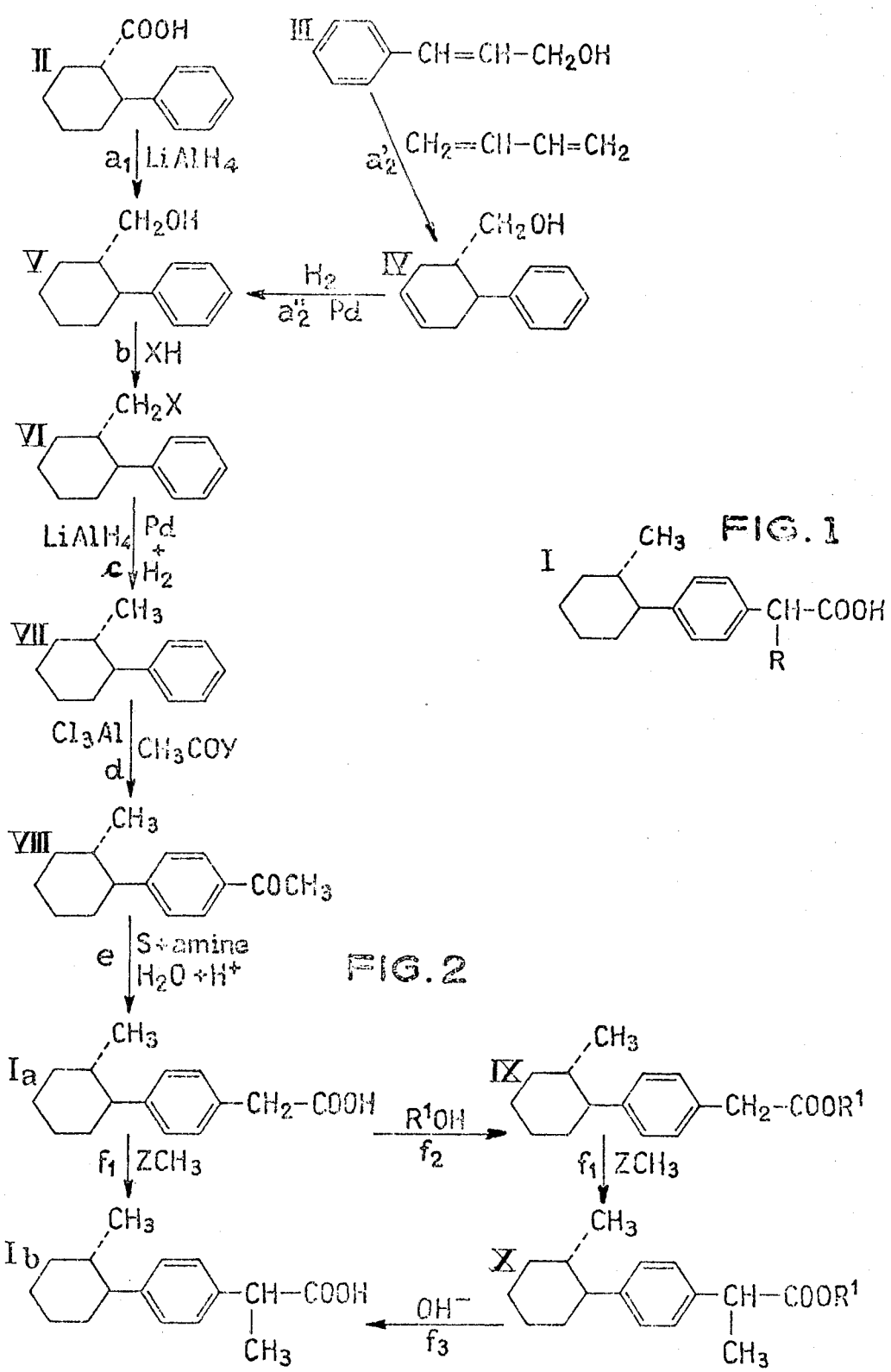

United States Patent [19]
Maillard et al.

[11] 3,846,485
[45] Nov. 5, 1974

[54] PHENYLACETIC ACID DERIVATIVES, A METHOD FOR THEIR PREPARATION AND THE APPLICATIONS THEREOF

[75] Inventors: Jacques Georges Maillard, Paris; Michel Langlois, Buc, both of France

[73] Assignee: Laboratories Jacques Logeais, Issy-les-Moulineaux, France

[22] Filed: Nov. 11, 1971

[21] Appl. No.: 197,912

[30] Foreign Application Priority Data
Nov. 24, 1970   France.............................. 70.42109

[52] U.S. Cl.......... 260/515 R, 260/456 R, 260/469, 260/501.1, 260/501.17, 260/592, 260/618 R, 260/618 H, 260/649 R, 260/668 R, 424/317
[51] Int. Cl............................................ C07c 63/00
[58] Field of Search............................ 260/469, 515

[56] References Cited
UNITED STATES PATENTS

| 3,385,886 | 5/1968 | Nicholson et al................... | 260/469 |
| 3,385,887 | 5/1968 | Nicholson et al................... | 260/469 |
| 3,755,427 | 8/1973 | Adams et al..................... | 260/515 A |

*Primary Examiner*—Lorraine A. Weinberger
*Assistant Examiner*—Patrick J. Hagan
*Attorney, Agent, or Firm*—Cooper, Dunham, Clark, Griffin & Moran

[57] ABSTRACT

The new derivatives of formula :

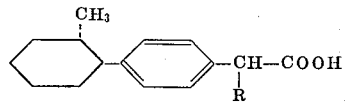

in which R is hydrogen or a methyl radical, are useful as anti-inflammatory drug.

2 Claims, 2 Drawing Figures

PHENYLACETIC ACID DERIVATIVES, A METHOD FOR THEIR PREPARATION AND THE APPLICATIONS THEREOF

This invention relates to phenylacetic acid derivatives, to a method for their preparation, to the applications thereof and to the intermediates used for their preparation.

Phenylacetic acid derivatives, particularly para-isobutylphenylacetic acid, are already known. The latter compound is an anti-inflammatory drug the systemic action of which does not occur through stimulation of the adrenal glands and, thus, is independent from the proper functioning of said glands. Unfortunately, it is relatively unsafe for the liver at the dosages at which it must be administered. The hepatic toxicity phenomena it produces have limited heretofore its use in human medicine.

The invention contemplates new phenylacetic acid derivatives such that the mechanism of their anti-inflammatory action does not involve the adrenal glands. Said new derivatives are much more active than para-isobutylphenylacetic acid and have low toxicity. It follows that they have a sufficient therapeutical margin to be administrable without fear of hepatic involvement.

The new compounds of the invention are selected from the phenylacetic acid derivatives having the formula:

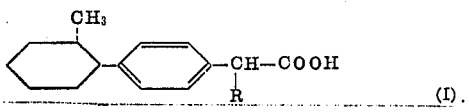

in which R is selected from hydrogen and the methyl radical, and their salts with bases. The formula I is also given in the accompanying drawing (FIG. 1).

Thus, said new derivatives are specifically: trans-4-(2'-methyl-cyclohexyl)-phenylacetic acid and trans-2-[4-(2'-methyl-cyclohexyl)-phenyl] propionic acid.

To prepare the phenylacetic acid derivatives having the formula:

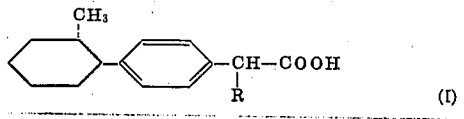

in which R is selected from hydrogen and the methyl radical, according to this invention, the trans-2-phenyl-cyclohexylcarbinol is converted by esterification to the compound having the formula

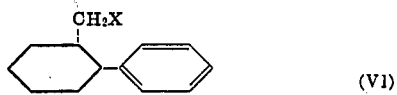

in which X is selected from the halogens and the radical p—$CH_3$—$C_6H_4$—$SO_2$—O—, this ester is reduced to trans-1-methyl-2-phenyl-cyclohexane, the latter is acetylated to the acetophenone having the formula:

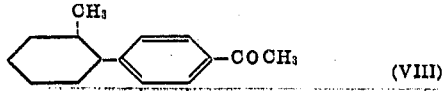

and said acetophenone is converted, by action of sulfur and an amine in the hot, to give a thioamide which is then hydrolyzed to the acid of formula (I) is which R is hydrogen, this acid being, if desired, subsequently methylated to give the acid having the formula I in which R is the methyl radical.

trans-2-Phenyl-cyclohexylcarbinol, which is a new compound, may be obtained by reduction of trans-2-phenyl-cyclohexane carboxylic acid. It may also be obtained by condensation of transcinnamyl alcohol with butadiene followed by catalytic hydrogenation of the resulting material.

The following description, given with reference to FIG. 2 of the accompanying drawing, will provide a better understanding of the actual practice of the invention.

To prepare the compounds of this invention, the following steps are contemplated:

1. STEP A. This step comprises preparing trans-2-phenyl-cyclohexylcarbinol (V). This may be effected by two different routes:

Route $a_1$ : Reduction of trans-2-phenyl cyclohexane carboxylic acid (II). This starting acid is described in an article by J. Klein published in J. Amer. Chem. Soc., 1958, 80, 1707. It is advantageously reduced with lithium aluminum hydride, preferably in the hot within an anhydrous solvent, such as tetrahydrofuran.

Route $a_2$ : Condensation ($a'_2$) of trans-cinnamyl alcohol (III) with butadiene according to a Diels-Alder reaction, followed by catalytic hydrogenation ($a''_2$) of the double bond of the resulting cyclohexenyl derivative (IV), for example with hydrogen in the presence of palladium.

2. STEP B. This step comprises forming a halogenated or tosyl ester (VI) of cyclohexyl carbinol (V) by reaction thereof with a reagent of the formula XH, X being halogen or the radical P—$CH_3$—$C_6H_4$—$SO_2$—O. Thus, the tosylate may be produced by reacting alcohol (V) with a para-toluene sulfonyl halide, particularly the chloride, in the cold and in the presence of a tertiary base such as pyridine, triethylamine, dimethylaniline, and the like, the halogenated ester being obtained by reacting alcohol (V) with an hydracid, particularly with hydrobromic or hydrochloric acid, with a thionyl halide or with a phosphorus trihalide.

3. STEP C : The ester is then reduced to trans-1-methyl-2-phenyl cyclohexane (VII). When the tosylate is involved, said reduction may be effected with lithium aluminum hydride within a solvent, such as tetrahydrofuran. The haloesters may be reduced by the same procedure or by catalytic hydrogenation, for example with hydrogen in the presence of palladium.

4. STEP D : Hydrocarbon (VII) is then acetylated to acetophenone (VIII) according to the Friedel-Crafts method, by means of an acetyl halide of the formula $CH_3COY$, Y being halogen, particularly chlorine, or of acetic anhydride in the presence of a conventional catalyst, such as aluminum chloride.

5. STEP E : Acetophenone (VIII) is converted to the desired acid IA (R = H) by the Willgerodt reaction which comprises reacting sulfur and an amine in the hot to give a thioamide, generally non-isolated, which is then hydrolyzed to acid Ia in acidic or alkaline medium.

6. STEP F : To obtain derivative Ib (R = CH$_3$) one may either react directly (step F$_1$) derivative Ia with a methylation reagent, such as methyl iodide, or first form (step F$_2$) an ester of acid I by esterification with an alcohol R$^1$OH, R$^1$ being alkyl, effect methylation (F$_1$) with said ester (IX) to give α-methyl ester (X) and finally regenerate the acid function by saponification (F$_3$).

The carbon α to the carboxyl function is asymmetrical when R is the methyl radical. It is understood that the invention includes within its scope the enantiomorphs corresponding to the various possible positions of the four different substituents of this carbon atom.

Salts with bases are readily prepared from acids I. One may use, in particular, inorganic bases such as alkali metal hydroxides (potassium hydroxide, sodium hydroxide), or alkali-earth metal hydroxides (e.g. magnesium hydroxide, calcium hydroxide), and generally any other hydroxide having a non-toxic cation. One may also use organic bases, in particular amines such as methyl amine, ethylamine, cyclohexylamine, benzylamine, methylglucamine, and the like.

The salt forming reaction is effected in the conventional manner by bringing together, preferably as solutions, the stoichiometric amounts of acids I and of the selected bases.

Intermediate compounds (V), (VI), (VII), (VIII), (IX) and (X) are new compounds and exhibit obviously a high degree of usefulness since they are the key to the synthesis of derivatives (I).

Specific examples of the preparation of the active derivatives and intermediates thereof contemplated by the invention are given below for non-limiting illustrative purposes.

EXAMPLE 1

A - trans-2-Phenyl-cyclohexylcarbinol (V)

38.7 g (0.19 mole) of trans-2-phenyl-cyclohexane carboxylic acid are dissolved in tetrahydrofuran (100 ml) and slowly added to a suspension of LiAlH$_4$ (11.4g; 0.3 mole) in tetrahydrofuran (300 ml) previously heated to refluxing. Boiling is maintained during a few hours, the cooled solution is then diluted with isopropanol (200 ml) and hydrolyzed with a saturated aqueous NaCl solution (140 ml). The resulting material is filtered off and the solvent is evaporated; the residue is taken up into a solvent, such as Grade C Gasoline (a straight-run gasoline cut distilling within the range from 70° to 100°C, having a specific gravity of about 0.700) which leaves an insoluble removed by filtration. Evaporation of the Grade C Gasoline leaves a residue which crystallizes. Weight: 34 g (Yield : 93 percent). M.p. = 48°–49°C. The resulting material may be recrystallized from ethanol.

| Analysis: | Calculated | Found |
|---|---|---|
| C% | 82.06 | 81.9 |
| H% | 9.53 | 9.4 |

B - trans-2-Phenyl-cyclohexylcarbinol tosylate (VI) (X = p—CH$_3$—C$_6$H$_4$—SO$_2$—O—)

To trans-2-phenyl-cyclohexylcarbinol (V) (10 g; 0.05 mole) dissolved in pyridine (80 ml) and cooled to 0°C, is added p-toluene sulfonyl chloride (14 g). After leaving overnight at 0°C, the pyridine hydrochloride precipitate is filtered off and the pyridine is evaporated under reduced pressure, at low temperature. The residue is taken up into ice-water and extracted with methylene chloride. The organic phase is washed with dilute HCl and with water, and is then dried and concentrated in vacuo, to give 11.7 g (Yield = 64 percent) of an oil which crystallizes slowly. m.p. = 73–75°C on recrystallization from a pentane-grade C gasoline mixture.

| Analysis: | Calculated | Found |
|---|---|---|
| C% | 69.73 | 69.5 |
| H% | 7.02 | 7.1 |
| S% | 9.30 | 9.0 |

C - trans-1-Methyl-2-phenyl-cyclohexane (VII)

LiAlH$_4$ (9 g; 0.23 mole) is suspended in anhydrous tetrahydrofuran (230 ml) and heated to refluxing. Tosylate (VI) (16.5 g; 0.048 mole) is slowly added thereto, and boiling is maintained during 48 hours. The cooled mixture is hydrolyzed by addition of isopropanol (180 ml) and a saturated aqueous NaCl solution (120 ml). After filtration and evaporation of the solvents, the residue is taken up into an ether-grade C gasoline mixture, filtered, washed with dilute HCl, then with water, after which it is isolated as an oil by evaporation of the solvents. Weight: 5.9 g (Yield: 71 percent). The product is purified by distillation. B.p. = 60°–64°C/0.2–0.3 mm Hg.

| Analysis: | Calculated | Found |
|---|---|---|
| C% | 89.60 | 90.0 |
| H% | 10.41 | 10.2 |

D - Trans-4-(2'-methyl-cyclohexyl)-acetophenone (VIII)

Pure aluminum chloride (22 g) is suspended in anhydrous cyclohexane (60 ml). Trans-1-methyl-2-phenyl-cyclohexane (VI) (13 g) is slowly added thereto at room temperature, and the mixture is stirred during 2 hours. It is then hydrolyzed by addition of crushed ice (250 g) and concentrated HCl (10 ml), after which it is extracted by means of an ether-benzene mixture. The organic phase is washed with sodium bicarbonate, with water, and is then dried and concentrated. The oily residue is rectified under 0.5 mm Hg. B.p. = 118°–123°C. Weight (9.5 g (Yield = 58 percent).

E - Trans-4-(2'-methyl-cyclohexyl)phenylacetic acid (Ia)

Trans-4-(2'-methyl-cyclohexyl)acetophenone (VIII) (9.2 g; 0.04 mole), sulfur (2.6 g; 0.06 g-at.) and anhydrous morpholine (5.6 g; 0.06 mole) are heated during 18 hours at about refluxing temperature (inner temperature : 135°C). Excess morpholine is removed in vacuo, the residue is taken up into ether, washed with dilute HCl, with water, and is then dried and isolated by evaporation in vacuo, to give 13.2 g of a brown oil comprising the thiomorpholide of the desired acid. The latter is hydrolyzed by boiling during 6 hours with acetic acid (23 ml), concentrated H$_2$SO$_4$ (3.6 ml) and water (5.3 ml). After cooling, the solution is neutralized with $CO_3Na_2$ and washed with ether. The desired acid is released by acidification of the aqueous phase, extracted into ether, isolated by evaporation of the ether and decolorized with charcoal in hot ethanol solution, to give 5.2 g of product (Yield 53 percent). B.p. = 130°–150°C/0.7 mm Hg. Crystallizes eventually, on standing. M.P. = 45°–48°C

| Analysis: | Calculated | Found |
|---|---|---|
| C% | 77.50 | 77.3 |
| H% | 8.68 | 8.8 |

EXAMPLE 2

A - Methyl trans-4-(2'-methyl-cyclohexyl)phenylacetate (IX)

Acid (Ia) (12.6 g; 0.05 mole) is dissolved in methanol (250 ml) containing concentrated $H_2SO_4$ (5 ml) and is heated to boiling during 20 hours. After neutralisation and evaporation of the methanol under reduced pressure, the residue is taken up into ether, washed with water, dried and distilled. B.p. = 112°–116°C/0.1 mm Hg. Weight: 11 g (Yield: 83 percent).

| Analysis: | Calculated | Found |
|---|---|---|
| C% | 78.0 | 77.7 |
| H% | 9.0 | 9.0 |

B - Methyl trans-2-[4-(2'-methyl-cyclohexyl)phenyl] propionate (X)

Sodium (1.1 g; 0.04 g-at.) is dissolved in liquid $NH_3$ (300 ml) in the presence of ferric nitrate. Methyl 4-(2'-methyl-cyclo-hexyl)phenylacetate (10.8 g; 0.04 mole) dissolved in anhydrous ether (15 ml) is slowly added thereto, with stirring. After 10 to 15 minutes, methyl iodide (18.9 g; 0.13 mole) dissolved in anhydrous ether (15 ml) is slowly added dropwise. Stirring is continued for a further hour, after which two-thirds of the $NH_3$ are allowed to evaporate. 150 ml of saturated $NH_4Cl$ solution are then added, the resulting material is extracted with ether and the ether phase is washed with sodium bicarbonate and then with water. Evaporation of the solvent leaves an oil: 10.3 g (Yield 90 percent). B.p. = 130°–136°C/0.05 mm Hg.

| Analysis: | Calculated | Found |
|---|---|---|
| C% | 78.42 | 77.9 |
| H% | 9.29 | 9.2 |

C - Trans Trans-2-[4-(2'-methyl-cyclohexyl)phenyl] propionic acid (Ib)

9.75 g (0.037 mole) of the preceding methyl ester dissolved in methanol (100 ml) are refluxed with potassium hydroxide (4.5 g) in water (50 ml). After evaporation of the methanol, the residue is taken up into water, made acidic and extracted with ether. After drying and evaporation, the ether solution leaves an oily residue, decolorized with charcoal in hot ethanol. Weight: 8.2 g (Yield: 89 percent). M.p. = 72–74°C.

| Analysis: | Calculated | Found |
|---|---|---|
| C% | 78.01 | 77.9 |
| H% | 9.0 | 9.2 |

The results of toxicological and pharmacological tests demonstrating the safe character of acids I and their anti-inflammatory effects are reported below.

The $LD_{50}$ of acids I is above 300 mg/kg in mice, by the intraperitoneal route.

On oral administration, acids I have a $LD_{50}$ which is also above 300 mg/kg in mice and rats.

Under the same conditions, para-isobutylphenylacetic acid has a $LD_{50}$ close to 350 mg/kg, but produces severe hepatic disorders.

In addition, acids I are substantially free from any influence on the central nervous system.

The anti-inflammatory properties of acids I were evidenced by the technique of carrhagenin-induced oedema, as described by Winter, Risley and Muss, Proc. Soc. Exp. Biol. Med., 1962, 111,544.

In this test, an oedema of the rear paw is induced in rat by subcutaneous injection, in the metatarsal area, of a 1 percent carrhagenin suspension (0.1 ml). 3 hours after injection, the oedema is evaluated volumetrically by comparing the injected paw with the other. The test materials were administered orally, one hour prior to carrhagenin injection.

The products were also tested orally in guinea-pig, in which an U.V. light induced erythema is produced according to the technique described by Winder and co-workers, Arch. Int. Pharmaco, 1958, 116, 261.

The following results were obtained:

| Product | Dose inhibiting the carrhagenin-induced oedema by a factor of 40% (in rat) | Percent protection against U.V. induced erythema (guinea-pig) |
|---|---|---|
| Ia | 78 mg/kg | 30 mg/kg → 70% |
| Ib | 6.5 mg/kg | 5 mg/kg → 35% |
| p-isobutyl-phenylacetic acid (reference) | 100 mg/kg | 60 mg/kg → 72% |

It is apparent from the above data that 30 mg/kg of acid Ia are sufficient to obtain 70 percent protection against U.V.-induced erythema while, with the known acid, 60 mg/kg of product, i.e., a twofold dosage, should be administered to obtain the same result.

As to acid Ib, its activity is incomparably superior to that of the known acid, since at a dosage reduced by a factor of 15 it makes it possible to obtain the same degree of inhibition of carrhageenin induced oedema.

The anti-inflammatory activity of acids I is also evidenced in rat submitted to suprarenalectomy.

In view of the very high therapeutical margin of acids I, in particular of acid Ib, said products may be administered without fear to humans for the treatment of a variety of inflammatory diseases, particularly of arthritic and rheumatic diseases. Therefore, this invention includes also within its scope a therapeutic composition comprising, as active ingredient, a compound selected from the phenylacetic acid derivatives having the formula

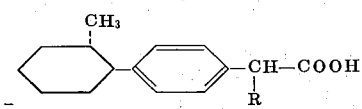

in which R is selected from hydrogen and the methyl radical, and their non-toxic salts, and a therapeutically administrable vehicle. This therapeutic composition may be administered by the usual routes, as tablets, capsules or suppositories, or injected in the form of solutions of inorganic or organic salts, at a dosage of from 50 mg to 2 g of active ingredient per 24 hours, together with a vehicle suitable for the route of administration selected.

An example of pharmaceutical formulation is given below:

| Tablet | | Minimum dosage | Maximum dosage |
|---|---|---|---|
| Active ingredient | | 20 mg | 100 mg |
| magnesium stearate | ) | | |
| lactose | ) to make | 100 mg | 500 mg |
| flavor | ) | | |

Having now described our invention what we claim and desire to secure by Letters Patent is:

1. A compound selected from the group consisting of trans-2-[4-(2'-methyl-cyclohexyl)-phenyl] propionic acid and its non-toxic salts.

2. trans-2-[4-(2'-Methyl-cyclohexyl)-phenyl] propionic acid.

* * * * *